April 26, 1949.　　　　D. SUSSIN　　　　2,468,381
X-RAY SPOT FILM TUNNEL
Filed March 4, 1946　　　　　　　　　　　3 Sheets-Sheet 1
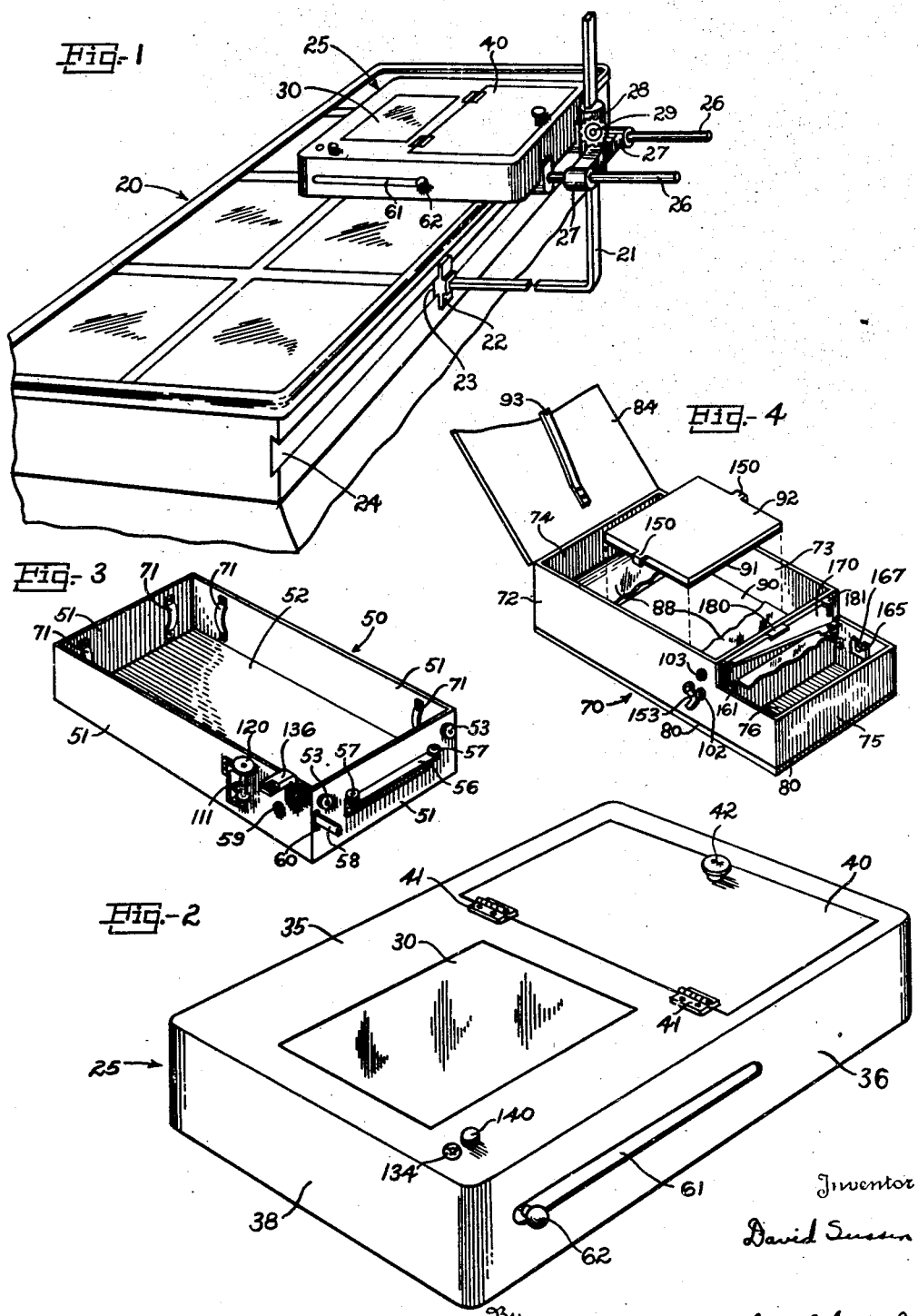
Inventor
David Sussin
By Marshall Biebel
Attorney

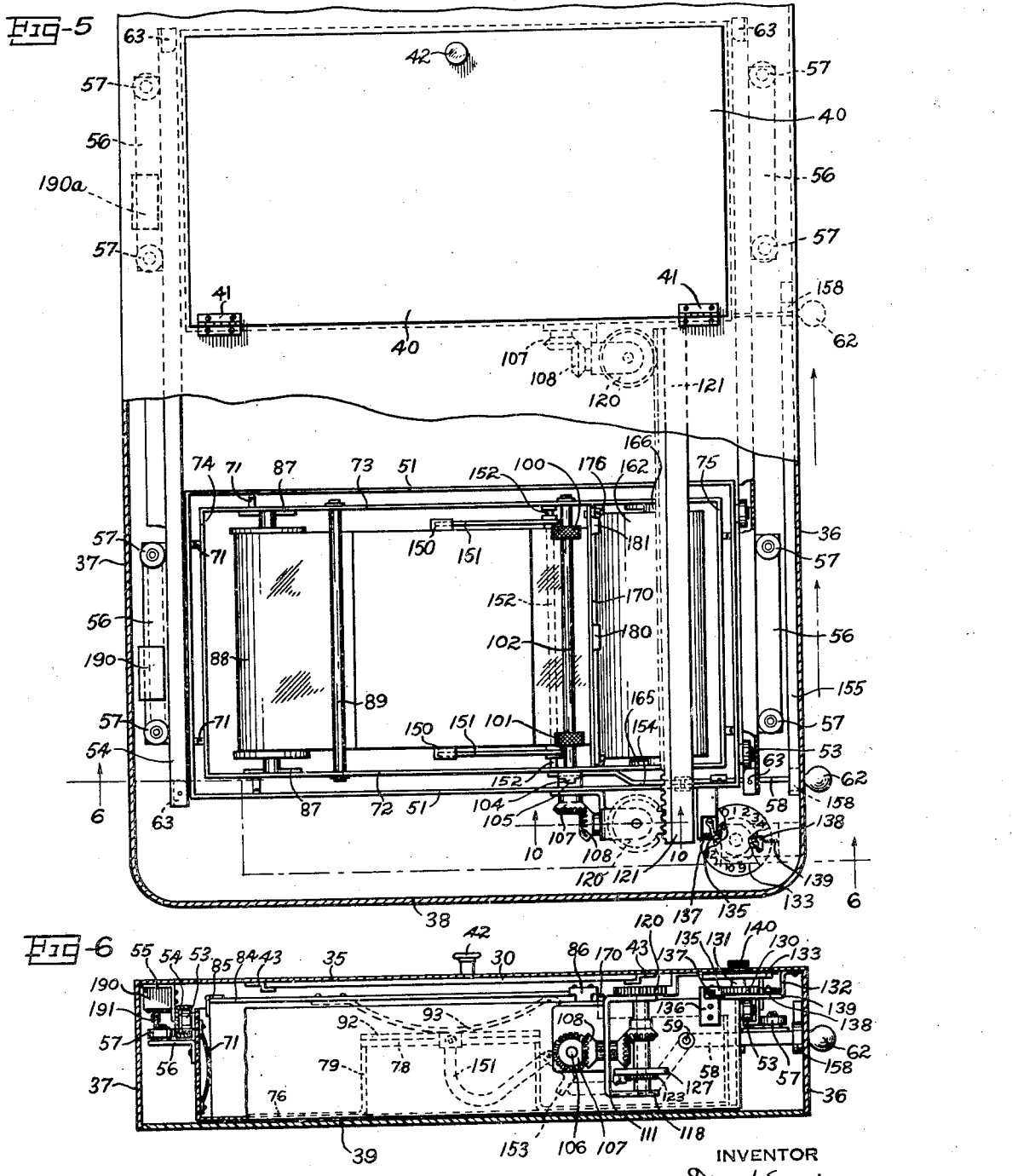

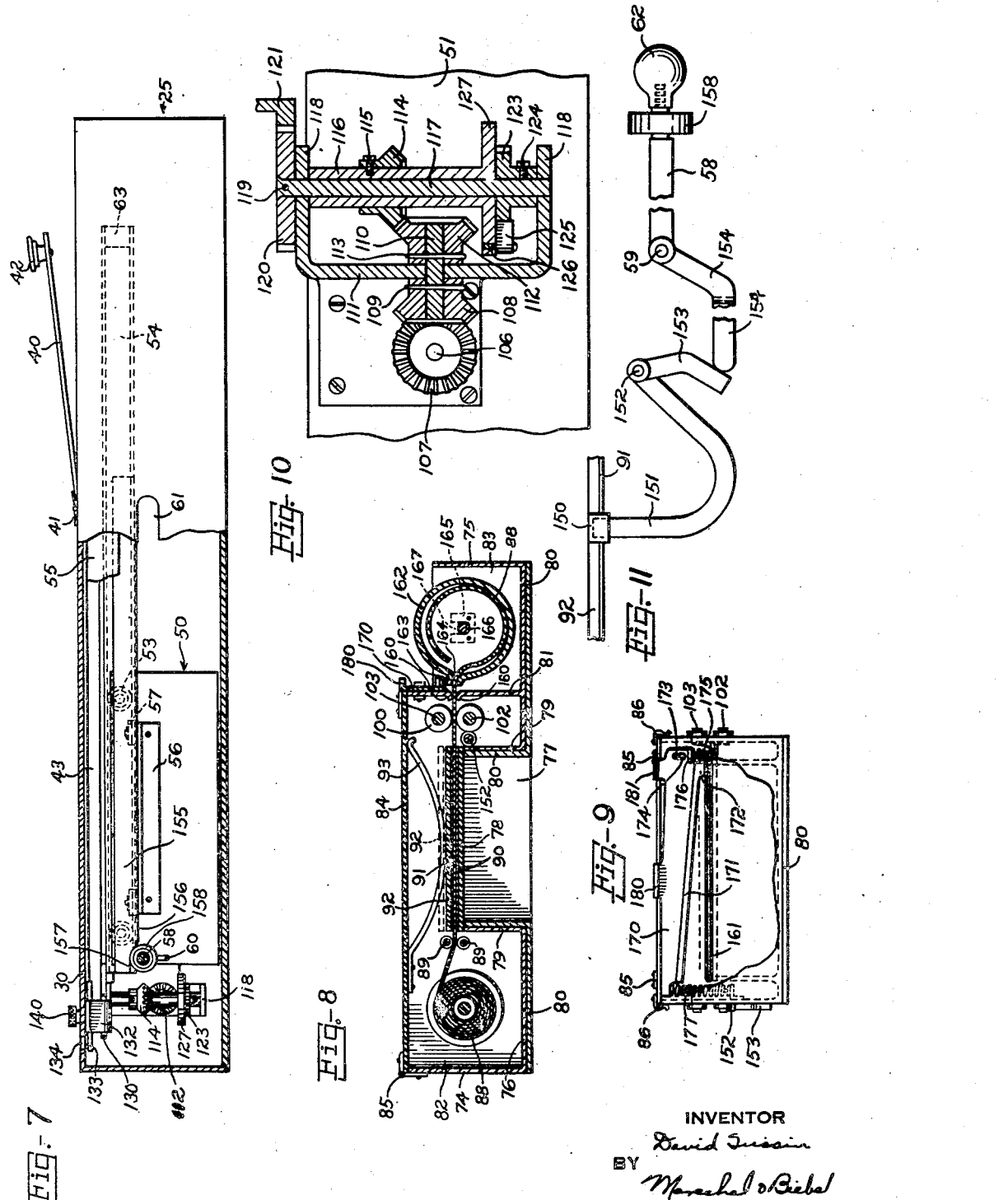

Patented Apr. 26, 1949

2,468,381

UNITED STATES PATENT OFFICE 2,468,381

X-RAY SPOT FILM TUNNEL

David Sussin, South Fort Mitchell, Ky., assignor to The Kelley-Koett Manufacturing Company, Covington, Ky., a corporation of Ohio Application March 4, 1946, Serial No. 651,890

7 Claims. (Cl. 250—66)

This invention relates to X-ray photography, and more particularly to a spot film tunnel for use in X-ray photography.

There are many occasions in the course of X-ray examinations in which the examining physician is desirous of obtaining a photographic record which is contemporaneous with the examination. A spot film tunnel is a device by which such a contemporaneous photograph may be obtained and in general comprises a support which may either be placed on the fluoroscopic screen of an X-ray table or utilized in place of the ordinary screen, in which case a screen is embodied within the tunnel itself. A cassette holding the film may be placed in a section of the tunnel and protected by lead from X-rays emanating from the table until a picture is to be made. It is highly advantageous for the examining physician to be able to observe the patient through the fluoroscope and concurrently to cause the cassette to shift from its protected position to a position of direct exposure to the X-rays so that the desired picture can be made practically simultaneously.

One of the objects of the present invention is to provide an improved spot film tunnel which will utilize roll film and which is so constructed that fluoroscopic examinations can be made between exposures of the film without damage to either the exposed or unexposed portions of the film.

A further object is to provide a spot film tunnel for X-ray photography which will utilize roll film and which can be loaded and unloaded in daylight while the tunnel is in working position in conjunction with X-ray examination apparatus.

Another object of the present invention is to provide an improved spot film tunnel of the above type having intensifying screens which will be in close contact with the film during exposure but which will be held free of the film at other times and particularly during relative travel of the film in the device.

An additional object is to provide a spot film tunnel wherein the intensifying screens for the film are removable from the line of sight through the viewing screen during fluoroscopy and are thus prevented from reducing the intensity of the fluoroscopic image.

It is also an object to provide a spot film tunnel of the above type which is so constructed as to permit the exposed portion of the film to be cut off and removed from the apparatus for immediate development without exposure or other danger to the remainder of the film.

Another object is to provide a spot film tunnel for X-ray photography which can be mounted on an X-ray examination table and used in all positions from Trendelenburg to vertical, and also which will permit the insertion of palpating cones without affecting the moving parts of the apparatus.

Other objects and advantages of the invention will be apparent from the following description, the accompanying drawings and the appended claims.

In the drawings, in which like characters of reference designate like parts throughout—

Fig. 1 is a diagrammatic perspective view illustrating a spot film tunnel embodying a preferred form of the invention, and shown mounted on an X-ray examination table;

Fig. 2 is an enlarged perspective view of the spot film tunnel shown in Fig. 1;

Fig. 3 is a perspective view of the carriage member which is mounted within the spot film tunnel and carries the film box;

Fig. 4 is a perspective view of the film box, the view being partially exploded and with parts broken away to show details of internal construction;

Fig. 5 is a partial enlarged plan view of the device shown in Fig. 2, with a portion of the cover broken away to show internal construction;

Fig. 6 is a section taken substantially on the line 6—6 in Fig. 5;

Fig. 7 is a side elevation, partly broken away, of the device shown in Fig. 2;

Fig. 8 is an enlarged view in longitudinal section of the film box;

Fig. 9 is an end elevation of the film box, with the film container removed and a portion of the wall broken away to show internal construction;

Fig. 10 is an enlarged detail view taken in section substantially on the line 10—10 in Fig. 5; and Fig. 11 is an enlarged detail view illustrating the control lever which also operates to move the intensifying screens from in contact with the film.

Referring first to Fig. 1, element 20 is representative of an X-ray examination table, along one side of which is mounted a right angled bracket 21 having longitudinal sliding movement by means such as the member 22 having a dovetail projection 23 engaging in a track 24 of complementary shape along table 20. A spot film tunnel designated generally as 25 carries a pair of longitudinally extending rods 26 engaging in the apertured arms 27 of a collar 28 slidably mounted on bracket 21 and adapted to be locked in a desired position by locking bolt 29. Bracket 21 is illustrated as rectangular in cross section to prevent rotation of collar 28 thereon. Element 30 in tunnel 25 represents a fluoroscopic screen and it will be seen that the illustrated construction permits the tunnel to be moved either longitudinally or laterally with respect to table 20 in order to make possible fluoroscopy or radiography at any desired portion of the table.

Referring now more particularly to Figs. 2 and 5 to 7, the film tunnel 25 comprises a generally rectangular box-like structure having a top 35, side walls 36 and 37, and end walls 38 preferably of steel or other suitable metal, and a bottom panel 39 of Bakelite or other suitable material readily permeable to X-ray radiation. An opening of substantial size is provided in top wall 35 of the tunnel and is provided with a closure panel 40 preferably hinged as indicated at 41 to the top of the tunnel and provided with a suitable handle member 42. Top 35 of the tunnel is also apertured to provide a viewing area for fluoroscope screen 30, which is shown as secured to the under side of top 35 by means of Z-shaped members 43 which may be riveted, spot welded, or otherwise secured to the under side of top 35.

A carriage member 50, shown in detail in Fig. 3, is mounted for longitudinal reciprocal movement within tunnel 25. Carriage 50 is generally in the shape of an open box, with side and end walls 51 preferably of metal and with the bottom 52 of metal, Bakelite or other material suitably permeable to X-ray radiation. This carriage is shown as suspended within tunnel 25 by means of rollers 53, which are secured to the ends of the carriage and ride in a pair of channel members 54 mounted within tunnel 25 by means of angles 55, which may be brazed, welded, or otherwise secured to channels 54 and to the inner surface of top 35 of the tunnel. Angles 56 are secured to the ends of carriage 50 and carry a further set of rollers 57 arranged for rotation about axes perpendicular to the axes of rollers 53 and which bear against the outer surfaces of channels 54 to prevent lateral shifting and thereby help to guide the carriage in its forward and backward movement within the tunnel, this construction being seen most clearly in Figs. 5 and 6.

An arm 58 is pivoted at 59 within one of the side walls of carriage 50 and extends through a vertical slot 60 in the adjacent end wall of the carriage and out through a longitudinally extended slot 61 in side wall 36 of tunnel 25, a knob 62 being provided at the outer end of the arm for convenience in handling. This arm and knob provide a convenient handle exterior of the tunnel by which the operator can move carriage 50 back and forth in the tunnel at will. It should be noted that slots 60 and 61 are of such dimensions vertically as to permit some degree of oscillation of arm 58 about pivot point 59 for a purpose to be described hereinafter. Stop members 63 of rubber or like material may be positioned at each end of channels 54 for contact with rollers 53 at the end of each movement of the carriage.

A film box indicated generally by the reference character 70 (Figs. 4 and 8) is adapted to be inserted in carriage 50 for back and forth movement therewith in tunnel 25. The inner walls of the carriage are shown provided with a plurality of leaf springs 71 adapted to bear against the side walls of box 70 and thereby to hold it firmly in place. This film box is so designed that it can be loaded with a roll of X-ray sensitive film in a manner similar to an ordinary camera and then inserted in the tunnel 25 while the latter is mounted upon an X-ray examination table without danger of accidental exposure. The overall dimensions of the film box are accordingly such that it may readily be inserted in the tunnel and removed therefrom by lifting hinged cover 40 in the top of the tunnel.

Referring more particularly to Figs. 4 and 8, film box 70 is shown as having side walls 72 and 73 and end walls 74 and 75 preferably of Bakelite or similar material. The bottom 76 of box 70 is recessed at 77 to provide a rectangular platform-like portion within the box and raised with respect to the remainder thereof. A panel 78 of Bakelite provides a bottom for this recessed portion and the side walls 79 thereof may also be of Bakelite. A layer of lead 80 is applied to these side walls 79 and also to the bottom 76 of the box to prevent the passage of X-rays and thereby to protect the film within the box, but this lead covering is omitted from Bakelite layer 78 since this is the area through which exposure of the film is made during radiography with the apparatus of the invention. The interior of film box 70 is divided by means of a transverse panel 81, which may be of metal, Bakelite or other suitable material, into two compartments 82 and 83 of unequal size. The larger compartment 82 is adapted to contain unexposed film and is provided with a suitable light-tight cover 84 of Bakelite or other suitable material hinged as at 85 to one of the walls of the box and provided with suitable latch devices 86. Within this compartment, means such as brackets 87 are provided for maintaining a roll of unexposed X-ray sensitive film 88, which is preferably of the double emulsion type. Film 88 is shown as passing through a pair of guide rolls 89 and between an intensifying screen 90 mounted on Bakelite panel 78, and a second intensifying screen 91 carried by a Bakelite panel 92 and adapted to be held in contact with the film by a spring 93 carried by cover 84.

Two pairs of friction rollers 100 and 101 shown as knurled in Fig. 5, are mounted on shafts 102 and 103 and are adapted to grip the edges of film 88 to advance it through the film box after each exposure. The driving mechanism for these rollers and shafts is shown most clearly in Figs. 5, 6 and 10. Shaft 102 is provided with a tongued end 104 adapted to engage in a complementary transverse slot 105 at the inner end of a stub shaft 106 journaled in the side wall of carriage 50 and carrying a bevel gear 107 on its outer end. The tongue and slot connection between members 104 and 105 provides for ready engagement and disengagement between shafts 102 and 106 when the film box is inserted in the carriage or removed therefrom. Gear 107 engages a complementary bevel gear 108 which is secured by a suitable pin 109 or equivalent means to a stub shaft 110 rotatably carried by an angle bracket member 111 mounted on the side of carriage 50. A third bevel gear 112 is similarly pinned at 113 to shaft 110 for coaxial rotation with bevel gear 108 and engages bevel gear 114, which is secured as by means of set screw 115 to sleeve member 116 mounted for rotation on shaft 117 carried by a yoke formed by bending out the ends 118 of bracket 111. The upper end of shaft 117 has pinned thereto at 119 a pinion 120 meshing with a rack 121 having an offset extension 122 by which it is secured to top 35 of the tunnel 25 by brazing or other suitable means.

The above construction provides that when carriage 50 is moved back and forth within the tunnel, the engagement between pinion 120 and rack 121 causes rotation of shaft 117. Means are also provided for connecting shaft 117 and sleeve 116 together in such manner that when the carriage moves one way in the tunnel sleeve 116 will rotate with shaft 117, and when the carriage moves the other way sleeve 116 will be disconnected from shaft 117 and will not rotate therewith. For example, a ratchet member 123 may be secured by a set screw 124, or pin to shaft 117 and adapted for engagement with pawl 125, which is pivotally mounted at 126 on annular plate 127 integral with, as shown, or otherwise secured to sleeve 116. A suitable spring, not shown, may be provided for urging pawl 125 into the desired engagement with ratchet member 123 while permitting the pawl to ride freely over the teeth of the ratchet member when the carriage moves in the other direction. The size of these various gears and particularly the size and tooth arrangement of pinion 120 and rack 121 will preferably be so selected that during the complete movement in one direction of the carriage, and preferably on the return movement from its position for radiography, knurled rollers 100 and 101 will be rotated sufficiently to advance film 88 the distance necessary to move the exposed area of film completely out of the way and to bring a fresh area of film in position for exposure. This provides for uniform advancement of the film for each full cycle of movement by the carriage irrespective of the amount of unused film remaining on the roll, thus not only making possible the use of roll film without a spool but also insuring against unequal advance of film or undesirable stress thereon such as may result when the advance is produced by positive rotation of a take-up spool as in a conventional roll film camera.

Means are provided for indicating the advance of the film as in a camera. A ratchet wheel 130 is secured to a stub shaft 131 carried by a suitable bracket 132 riveted, brazed, or otherwise secured within the tunnel. The other end of shaft 131 carries a dial 133 on which numbers may be arranged in suitably spaced relation and adapted to register in the appropriate sequence with a viewing aperture 134 in cover 35 of the tunnel. Ratchet wheel 130 is adapted to be actuated by a pawl 135 mounted on an angle 136 carried by one of the side walls of carriage 50. Spring 137 is provided to urge pawl 135 into contact with the teeth of ratchet 130 on the forward motion of the carriage but to permit it to ride over these teeth on the return stroke. A second pawl 138 and spring 139 may be mounted on bracket 132 to prevent rotation of ratchet 130 in the wrong direction. If desired, a knob 140 may be provided on the outside of the tunnel and secured to shaft 131 to set the indicator dial 133 in the desired position for each new film. Since the tunnel will normally be used in a darkened X-ray room, the numbers of indicator dial 133 should be luminous, or at least the last number should be luminous so as to indicate to the operator when the last exposure of the roll of film has been made.

Means are provided for actuating intensifying screen 91 so that it is pressed firmly into contact with film 88 during exposure but is lifted out of contact with the film while the latter is in motion within the film box in order to prevent scratching or other damage to the film. Bakelite panel 92 which carries intensifying screen 91 has at the sides a pair of ear members 150 adapted for engagement with the ends of a pair of lever arms 151, which are secured at their other ends for rotation with a shaft 152 mounted within the film box. Another lever arm 153 is similarly secured to shaft 152 outside wall 72 of the film box and is adapted for engagement with an extension 154 on arm 58. This construction is shown in skeletal outline in Fig. 11 and is such that when arm 58 pivots downward in slots 60 and 61 about its pivot point 59, its extension 154 acts as a cam to force lever arm 153 in a clockwise direction with shaft 152 and thus raises lever arms 151 and through them Bakelite panel 92 and its associated intensifying screen 91. An elongated cam member 155 is secured to side wall 36 of tunnel 25 partially overlapping the elongated slot 61 in said side wall, this cam being illustrated most clearly in Fig. 7. As shown, it has a step-down construction, with a greater portion 156 of its length extending down across slot 61 to an extent sufficient to force arm 58 downwardly about its pivot point 59 and thus to raise Bakelite panel 92 as described. Adjacent its left hand end as viewed in Fig. 7, cam 155 is cut away at 157 to permit arm 58 to rise under the tension transmitted thereto from spring 93 through lever arms 151 and 153. A roller 158 journaled on the end of arm 58 rides on cam 155 to facilitate forward and backward motion.

The above construction insures that film 88 will be pressed firmly but yieldingly between intensifying screens 90 and 91 during exposure, but by reason of the yieldable construction of spring 93 these members will be cushioned against too rapid contact such as might injure the film or result in uneven pressure. Furthermore, the positive release of the pressure between the film and screens 90 and 91 during the advance of the film within the film box as the carriage moves across the tunnel prevents scratching or other injury of the film and screens 90 and 91 as the film is advanced to position for successive exposures, and it will also be seen that the advancement mechanism and its coupling with the carriage movement positively prevents double exposure. Since also both intensifying screens are carried in the film box, they are thus removed from within the line of view for fluoroscopic examination and are prevented from absorbing the X-ray beam utilized for fluoroscopy, which is normally of such low intensity for the protection of the patient that any reduction will seriously limit visual acuity. The illustrated manual control of carriage travel through lever arm 58 provides for smooth and quiet movement without jar or vibration such as may be caused by spring-actuated and like controls. It should be noted that an additional lever may be secured to the opposite end of the carriage from lever arm 58 to provide for ready control of the device by the left hand of the operator, which may be necessary under examination conditions requiring the use of the right hand for holding or manipulating the patient's body. Such a left hand lever need not have a mechanical connection to the controls shown in Fig. 11 since the latter will function automatically upon movement by the carriage.

The film which has been exposed and is moved away from the exposing position by rollers 100 and 101, as described, is passed between a pair of inwardly extending horizontal lips 160 on panel 81 having a slot 161 therebetween, preferably of just sufficient width to permit ready passage of the film. Adjacent the outer side of this slot 161 there is provided a light-tight separable container shown as a cylindrical casing 162 provided with extended lips 163 enclosing a slot 164 and adapted for close registry with slot 161. This casing 162 may be mounted in suitable fashion within compartment 83 in film box 70 as, for example by providing brackets 165 adapted to receive suitable locating and supporting lugs 166 on container 162 and indicated as having flattened sides adapted to be guided by the sides of the complementary slots 167 in brackets 165 into the proper position of registry between lips 163 and slot 161. With this construction the exposed film will be advanced by the rotation of rollers 100 and 101 and guided by lips 160 and 163 through slots 161 and 164 into the interior of container 162, as is illustrated particularly in Fig. 8. The extended lips 163 protect the film against exposure to light when cover 40 is raised and also aid in preventing light from entering the interior of casing 162.

Means are provided for severing the film for immediate development and study without damaging the unexposed film still remaining in the film box and also for marking the film, as by notching, to indicate the margin between adjacent exposed areas thereof, such marking being desirable, for example, to provide guides for subsequently cutting the film up into individual strips for processing by equipment adapted to handle only cut film. Referring particularly to Figs. 4 and 9, a knife member 170 is mounted on panel 81 for downward movement across slot 161. This knife includes a main blade portion 171 of a width sufficient to extend across the entire film 88 and a small blade portion 172 offset below the main blade portion 171 and at one end of the knife adapted to engage only the adjacent edge of the film. At its end adjacent blade portion 172, knife 170 is provided with a vertically arranged slot 173 which receives pin 174 mounted in wall 81, slot 173 being of sufficient length to permit limited linear vertical movement of this end of the knife as well as swinging movement about pin 174. A spring 175 engages an outwardly turned lug 176 on knife 170 below slot 173 and normally urges this end of the knife upward until pin 174 engages the bottom of slot 173. The opposite end of the knife is supported by a spring 177, both of these springs being provided with mounting means permitting them to bow as well as to be compressed axially. A handle 180 spaced from the pivot point of the knife provides for control of the swinging movement of the knife about this pivot point, and a second handle 181 is provided adjacent the pivot point.

With this construction, when downward pressure is applied to handle 181, the knife will move downward substantially vertically until pin 174 engages the upper end of slot 173, since the heavier spring 177 will tend to hold up the unpivoted end of the knife and thus prevent it from pivoting. This limited downward travel will force the smaller and offset blade portion 172 through the edge of the film to provide a notch, but slot 173 is of such length that the directly downward motion of the knife will be arrested before the longer blade portion 171 begins to cut. If, however, it is desired to sever the film completely, it is merely necessary to apply the downward pressure to handle 180 to force the knife to pivot about pin 174 and thus to sever the film, this cutting operation also being aided by slanting blade portion 171 as shown to provide for a shearing cut across the film.

The above construction provides for quickly and easily notching the edge of film 88 after each exposure to indicate the margin between adjacent pictures thereon. In addition, after the desired number of exposures have been made and the film collected in container 162, knife 170 may be operated to sever the exposed film from the remainder of the roll and casing 162 removed from the tunnel and taken immediately to the dark room for development. This operation will not damage the unexposed portion of the film since it is protected within the light-tight compartment 82 under cover 84. Furthermore, since the severed end of the film is supported in lips 160 or panel 81, it will not require rethreading but can continue to be fed into another container 162 which can be substituted for the one removed to the dark room.

A switch of suitable design and shape indicated generally at 190 is provided within the tunnel and positioned for actuation by the carriage for the proper controlling of the high tension circuit which is utilized in the X-ray apparatus for radiography. As shown lever 191 extends from switch 190 into the path of one of rollers 57 so that it will be moved into the "on" position by engagement with the roller when the carriage comes forward and will be returned to the "off" position on the return movement of the carriage. This switch is preferably so connected that it will automatically increase the power of the X-ray tube to cause exposure of the film, or it may merely turn on the necessary circuit to heat up the tube filaments in preparation for actuation by the foot treadle, switch or timer conventionally used for radiography. The electric circuits for this switch are not shown since they will be readily understood by those skilled in the art.

If additional switches are desired for control of the timer, bucky or other parts, they may also be provided, as indicated in dotted lines at 190a, for convenient and automatic operation by the movement of the carriage. In such event the switch controlling the circuits to the tube should be positioned to be actuated first, as by locating at the position shown at 190a.

In using the above described embodiment of the invention film box 70 will usually be loaded away from the machine and then inserted in carriage 50 within the tunnel as described. During normal fluoroscopic examinations, the carriage and film box will be out of line with the fluoroscopic screen and in the position indicated in dotted lines at the top of Fig. 5. The examining physician has the continued use of the fluoroscope for constant observation and at the instant when he wishes to make a film record, it is merely necessary for him to move the carriage forward by drawing handle 62 along slot 61 to the forward end of the slot. The desired exposure may then be made either with switch 190 as described or by means of the conventional treadle or other switch. After the exposure is made, handle 62 is pushed back to the other end of slot 61, carrying with it carriage 50, and during this motion the exposed film will be advanced into container 162. This operation may be repeated rapidly and as frequently as unexposed film remains within the film box, or it may be interrupted if desired to sever the exposed film and remove it for development and examination. When the film is entirely used up, an alternate film box which may already have been loaded with fresh film may be substituted within the tunnel without moving it from the examination table and no precautions need be taken to prevent accidental exposure during this step, thus greatly speeding detailed examinations requiring many pictures. It will also be noted that since with the illustrated device the motion of the carriage will at all times be in a horizontal plane, complications resulting from a tendency to motion of the carriage by the forces of gravity are avoided not only when the table is horizontal as shown in Fig. 1 but in all other commonly used positions of the table from Trendelenburg to vertical. Furthermore, the device of the invention is readily operable with compression or "palpating" cones conventionally used in X-ray work for forcing portions of the patient's body into desired position for fluoroscopy or radiography. Such cones, which are commonly formed of balsa wood or spun aluminum, may be inserted and held in position between the bottom of the tunnel and the body of the patient without interfering with the use and operation of the device for either fluoroscopy or radiography as described.

While the form of apparatus herein described constitutes a preferred embodiment of the invention, it is to be understood that the invention is not limited to this precise form of apparatus, and that changes may be made therein without departing from the scope of the invention which is defined in the appended claims.

1. Apparatus of the class described comprising, in combination, a tunnel member adapted for mounting in conjunction with a source of X-ray radiation, a fluorescent screen positioned in said tunnel, a carriage member mounted for longitudinal movement within said tunnel into and out of line with said fluorescent screen, a film box adapted for readily removable positioning within said carriage and movable therewith, said film box including means for mounting a supply of X-ray sensitive film, means responsive to movement of said carriage within said tunnel for automatically advancing said film by a predetermined length within said film box to position separate areas thereof for exposure, and substantially light-tight means enclosing the film-containing portions of said film box and protecting said film from accidental exposure during insertion of said film box in said carriage and said tunnel and removal therefrom.

2. Apparatus of the class described comprising, in combination, a tunnel member adapted for mounting in conjunction with a source of X-ray radiation, a fluorescent screen positioned in said tunnel, a carriage member mounted for longitudinal movement within said tunnel into and out of line with said fluorescent screen, a film box adapted for readily removable positioning within said carriage and movable therewith, said film box including a light-tight compartment provided with means for mounting a supply of unexposed X-ray sensitive film and means providing a separate light-tight compartment for exposed film spaced from said unexposed film compartment, means responsive to movement of said carriage within said tunnel for automatically advancing said film from said unexposed film compartment to said exposed film compartment, intensifying screens supported in said carriage adjacent each surface of said film and movable with said carriage away from said screen leaving said screen unobstructed for fluoroscopy and yieldable means for urging said intensifying screens into contact with said film when said carriage is in line with said fluorescent screen.

3. Apparatus of the class described comprising, in combination, a tunnel member adapted for mounting in conjunction with a source of X-ray radiation, a fluorescent screen positioned in said tunnel, a carriage member mounted for longitudinal movement within said tunnel into and out of line with said fluorescent screen, a film box adapted for readily removable positioning within said carriage and movable therewith, said film box including a light-tight compartment provided with means for mounting a supply of unexposed X-ray sensitive film, a container providing a separate light-tight compartment for exposed film spaced from said unexposed film compartment, convolute means in said exposed film compartment for receiving and guiding the film delivered thereto into a self-coiling roll, means supporting said container in said film box for ready removal therefrom, means responsive to movement of said carriage within said tunnel for automatically advancing said film by a predetermined length from said unexposed film compartment to said exposed film compartment, means for removably mounting said container in said film box, and means supported on said film box for severing said film at a point between said advancing means and said container.

4. Apparatus of the class described comprising, in combination, a tunnel member adapted for mounting in conjunction with a source of X-ray radiation, a fluorescent screen positioned in said tunnel, a carriage member mounted for longitudinal movement within said tunnel into and out of line with said fluorescent screen, a film box adapted for readily removable positioning within said carriage and movable therewith, said film box including a light-tight compartment provided with means for mounting a supply of unexposed X-ray sensitive film and means providing a separate light-tight compartment for exposed film spaced from said unexposed film compartment, means responsive to movement of said carriage within said tunnel for automatically advancing said film from said unexposed film compartment to said exposed film compartment, intensifying screens supported in said carriage adjacent each surface of said film and movable with said carriage away from said screen leaving said screen unobstructed for fluoroscopy, yieldable means for urging said intensifying screens into contact with said film when said carriage is in line with said fluorescent screen, means for moving said intensifying screens apart against the urging of said yieldable means to relieve the pressure of said intensifying screens on said film, and means for actuating said means for moving said intensifying screens apart upon movement of said carriage out of line with said fluorescent screen.

5. Apparatus of the class described comprising, in combination, a tunnel member adapted for mounting in conjunction with a source of X-ray radiation, a fluorescent screen positioned in said tunnel, a carriage member mounted for longitudinal movement within said tunnel into and out of line with said fluorescent screen, a film box adapted for readily removable positioning within said carriage and movable therewith, said film box including a light-tight compartment having a displaceable cover providing access thereto, means within said compartment for mounting a supply of unexposed X-ray sensitive film, a panel in said compartment adapted to support a portion of said film for exposure, movable friction means in said compartment adapted to grip the edges of said film for progressively advancing a predetermined length of said film across said panel to position successive areas of said film in register with said panel for exposure, a container for exposed film carried by said film box outside said compartment, means carried by said carriage for driving said friction means, means providing a readily disengageable connection between said driving means and said friction means, and means carried by said tunnel for automatically actuating said driving means upon motion of said carriage in said tunnel.

6. Apparatus of the class described comprising, in combination, a tunnel member adapted for mounting in conjunction with a source of X-ray radiation, a fluorescent screen positioned in said tunnel, a carriage member mounted for longitudinal movement within said tunnel into and out of line with said fluorescent screen, and a film box adapted for readily removable positioning within said carriage and movable therewith, said film box including means for mounting a roll of X-ray sensitive film, means responsive to movement of said carriage within said tunnel for automatically advancing said film by a predetermined length within said film box to position separate areas thereof for exposure, blade means of narrow extent transversely of the film supported by said film box and movable at an angle with respect to said film to provide a notch in the edge thereof for indicating the margin between adjacent exposed areas, and substantially light-tight means enclosing the film-containing portions of said film box and protecting said film from accidental exposure during insertion of said film box in said carriage and said tunnel and removal therefrom.

7. Apparatus of the class described comprising, in combination, a tunnel member adapted for mounting in conjunction with a source of X-ray radiation, a fluorescent screen positioned in said tunnel, a carriage member mounted for longitudinal movement within said tunnel into and out of line with said fluorescent screen, a film box adapted for readily removable positioning within said carriage and movable therewith, said film box including a light-tight compartment provided with means for mounting a roll of X-ray sensitive film, a slot in one wall of said compartment, a removable, light-tight container for exposed film positioned adjacent the outer surface of said wall and having a slot adapted to register with said slot in said wall, means responsive to movement of said carriage within said tunnel for automatically advancing said film from said roll compartment in predetermined lengths through said slots into said container, and cutter means mounted on said film box for movement across said slots, said cutter means having a relatively narrow notching portion and an elongated cut-off portion extending across the width of said film, and means for selectively actuating said notching portion and said cut-off portion to provide a notch in the edge of said film for indicating margin between adjacent exposed areas thereof or to sever said film adjacent said container.

DAVID SUSSIN.

REFERENCES CITED

The following references are of record in the file of this patent:

UNITED STATES PATENTS

| Number | Name | Date |
| --- | --- | --- |
| 2,174,738 | Eddy | Oct. 3, 1939 |
| 2,391,191 | Powers | Dec. 18, 1945 |

FOREIGN PATENTS

| Number | Country | Date |
| --- | --- | --- |
| 277,420 | Great Britain | Sept. 15, 1927 |